US008367034B2

(12) United States Patent
O'Brien et al.

(10) Patent No.: US 8,367,034 B2
(45) Date of Patent: Feb. 5, 2013

(54) METHODS FOR PREPARING SINGLE-WALLED CARBON NANOTUBES

(75) Inventors: Stephen O'Brien, New York, NY (US); Limin Huang, New York, NY (US); Brian Edward White, Walton, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 1252 days.

(21) Appl. No.: 11/628,256

(22) PCT Filed: Jun. 3, 2005

(86) PCT No.: PCT/US2005/019441
§ 371 (c)(1),
(2), (4) Date: Sep. 26, 2007

(87) PCT Pub. No.: WO2006/004599
PCT Pub. Date: Jan. 12, 2006

(65) Prior Publication Data
US 2008/0069760 A1    Mar. 20, 2008

Related U.S. Application Data

(60) Provisional application No. 60/577,110, filed on Jun. 4, 2004.

(51) Int. Cl.
*D01F 9/127* (2006.01)
*B01J 21/08* (2006.01)
*B01J 23/88* (2006.01)
*B01J 23/75* (2006.01)
*B82B 1/00* (2006.01)

(52) U.S. Cl. ............... 423/447.3; 423/447.1; 423/447.6; 423/445 B; 423/447.2; 977/842; 977/843; 502/240; 502/255; 502/260; 502/305; 502/314; 502/321

(58) Field of Classification Search ............... 423/447.1, 423/447.2, 447.6, 445 B; 977/842, 843; 502/240, 255, 260, 305, 314, 321
See application file for complete search history.

(56) References Cited

U.S. PATENT DOCUMENTS

| 6,333,016 | B1 | 12/2001 | Resasco et al. |
| 6,472,030 | B1 | 10/2002 | Balkus, Jr. et al. |
| 2005/0112052 | A1* | 5/2005 | Gu et al. .................... 423/447.1 |

OTHER PUBLICATIONS

Yoichi Murakami, Shigehiro Yamakita, Tatsuya Okubo, and Shigeo Maruyama, "Single-walled carbon nanotubes catalytically grown from mesoporous silica thin film," Chemical Physics Letters 375 (2003), pp. 393-398.*
Alan M. Cassell, Nathan R. Franklin, Thomas W. Tombler, Emory M. Chan, Jie Han, and Hongjie Dai, "Directed Growth of Free-Standing Single-Walled Carbon Nanotubes," J. Am. Chem. Soc. (1999) 121, pp. 7975-7976.*
Limin Huang, Shalom J. Wind, and Stephen P. O'Brien, "Controlled Growth of Single-Walled Carbon Nanotubes from an Ordered Mesoporous Silica Template," Nano Letters vol. 3 No. 3 (2003), pp. 299-303.*
Kruk, M., "Synthesis and Characterization of Hexagonally Ordered Carbon Nanopipes," Chem. Mater. 2003, vol. 15, pp. 2815-2823.

* cited by examiner

*Primary Examiner* — Steven Bos
*Assistant Examiner* — Diana J Liao
(74) *Attorney, Agent, or Firm* — Schwegman Lundberg Woessner P.A.

(57) ABSTRACT

The present invention relates to cobalt and molybdenum doped mesoporous silica catalysts and methods for using the catalysts to making Single-Walled Carbon Nanotubes. The methods offer increased control over the orientation, length and diameter of the nanotubes produced.

27 Claims, 6 Drawing Sheets

METHODS FOR PREPARING SINGLE-WALLED CARBON NANOTUBES

This application is a U.S. National Phase application under 35 U.S.C. 371 of International patent application no. PCT/US2005/019441, filed Jun. 3, 2005, which claims the benefit of U.S. provisional application No. 60/577,110, filed Jun. 4, 2004, the disclosure of which are incorporated by reference herein in their entireties.

The invention disclosed herein was made with U.S. Government support from the National Science Foundation (CHE-0117752 and DE-FG02-03ER15463) and the New York State Office of Science, Technology and Academic Research (NYSTAR). Accordingly, the U.S. Government and the State of New York have certain rights in this invention.

FIELD OF THE INVENTION

The present invention relates to cobalt and molybdenum doped mesoporous silica catalysts and methods for using the catalysts to making Single-Walled Carbon Nanotubes. The methods offer increased control over the orientation, length and diameter of the nanotubes produced.

BACKGROUND OF THE INVENTION

Single-Walled Carbon Nanotubes are one-dimensional nanometer-diameter molecular wires that have unique electrical, mechanical, electro-optical and electromechanical properties. As such, these nanotubes show promise as potential building blocks for future nanoscale electronic devices, such as field emitting devices, field-effect-transistors, single-electron-transistors, molecular sensors, and the like.

Single-Walled Carbon Nanotube based-devices can be prepared by deposition of a nanotube suspension on substrates, or via carbon vapor deposition (CVD) growth of individual nanotubes directly on substrates. The direct CVD growth method typically provides individual Single-Walled Carbon Nanotubes with few structural defects, while the preparation of Single-Walled Carbon Nanotube based-devices via deposition of a nanotube suspension on substrates usually results in Single-Walled Carbon Nanotubes which exist in bundles or single tubes of submicron lengths and which can have defects arising from post-synthetic destructive treatments. As such, the preparation of Single-Walled Carbon Nanotubes using the CVD growth method enjoys certain advantages over the nanotube suspension method and would appear to be the method of choice for large-scale fabrication of Single-Walled Carbon Nanotubes. But using the CVD growth method in the absence of external guidance methods typically yields short and randomly oriented nanotubes. For the purposes of fundamental study or device fabrication, it would be ideal to develop methods for making Single-Walled Carbon Nanotubes which allow for control over diameter, helicity, orientation and length.

Recent progress has been made in developing methods for the surface growth of Single-Walled Carbon Nanotubes wherein there is a slight degree of control over the diameter and orientation of the nanotubes being produced. It has been reported that a correlation exists between the size of the catalyst nanoparticles used and the diameter of the Single-Walled Carbon Nanotubes that are produced. As such, some control over the diameter of growing tubes has been realized by depositing uniform and monodisperse catalyst nanoparticles on substrates. In addition, it has also been reported that some degree of control over the orientation of Single-Walled Carbon Nanotubes could be achieved via the use of an external electric field during a CVD process, and this alignment effect is believed to originate from the high polarizability of the nanotubes. However, neither fabricating a microelectrode array nor introducing a strong electric field during the CVD growth is easy, especially for the large-scale fabrication. Lately, a fast heating process was reported that allows the growth of long (mm in length) and well-oriented Single-Walled Carbon Nanotubes by CVD using carbon monoxide as a carbon feedstock.

Thus, there still exists a need in the art for methods of making Single-Walled Carbon Nanotubes which allow a higher degree of control over various physical parameters of the nanotubes as they are made. This invention addresses that need.

SUMMARY OF THE INVENTION

In one aspect, the invention provides catalysts comprising mesoporous silica, cobalt and molybdenum. The catalysts are useful for making Single-Walled Carbon Nanotubes.

In another aspect, the invention provides catalysts comprising mesoporous silica, cobalt and molybdenum, wherein the catalysts are affixed to the surface of a substrate, the substrate acting as a catalyst support.

In still another aspect, the invention provides methods for calcination comprising heating a catalyst-containing substrate for a time and at a temperature sufficient to calcine the catalyst.

In a further aspect, the invention provides methods for making a single-walled carbon nanotube, the methods comprising contacting a catalyst of the invention with a flow of carbon feedstock gas for a time and at a temperature sufficient to make a single-walled carbon nanotube.

The present invention may be understood more fully by reference to the following detailed description and illustrative examples, which are intended to exemplify non-limiting embodiments of the invention.

DETAILED DESCRIPTION OF THE INVENTION

The present invention provides methods useful for making Single-Walled Carbon Nanotubes, the methods comprising a carbon vapor deposition (CVD) process using a catalyst comprising mesoporous silica, cobalt and molybdenum. The present methods can provide increased control over the orientation, length and diameter of the nanotubes as they are grown. Further, the present methods do not require a specific fast heating technique or the guidance of external electric field.

Catalyst

In one aspect, the invention provides catalysts useful for making Single-Walled Carbon Nanotubes. Catalysts useful in the present methods for making Single-Walled Carbon Nanotubes include catalysts comprising mesoporous silica, cobalt and molybdenum.

In one embodiment, the mesoporous silica exists in the form of a thin film having ordered pore structures and uniform nanoporous channels.

In one embodiment, the mesoporous silica is SBA16 (a three-dimensional mesoporous $SiO_2$, with nanopores of about 5.4 nm in diameter, wherein pore openings that are perpendicular to the surface).

In another embodiment, the mesoporous silica is SBA15 (a three-dimensional mesoporous $SiO_2$, with nanopores of from about 4 nm to about 10 nm in diameter, wherein pore openings are perpendicular to the surface).

In yet another embodiment, the mesoporous silica is SBA11 (a three-dimensional mesoporous $SiO_2$, with nanopores of from about 2 nm to about 3 nm in diameter, wherein pore openings are on the surface).

In still another embodiment, the mesoporous silica is MCM41 (a one-dimensional mesoporous $SiO_2$, with nanopores of about 3 nm, wherein pore channels are parallel to the surface).

In still another embodiment, the mesoporous silica is MCM48 (a three-dimensional mesoporous $SiO_2$, with nanopores of from about 2 nm to about 3 nm in diameter, wherein pore openings are on the surface).

In one embodiment, the mesoporous silica has nanoporous channels of about 2 nm to about 6 nm.

In another embodiment, the mesoporous silica has nanoporous channels of about 5 nm to about 6 nm.

In another embodiment, the mesoporous silica has nanopores of from about 1 nm in diameter to about 10 nm in diameter. In another embodiment, the nanopores are from about 2 nm in diameter to about 8 nm in diameter. In another embodiment, the nanopores are from about 4 nm in diameter to about 6 nm in diameter. In a specific embodiment, the nanopores are from about 2 nm in diameter to about 3 nm in diameter. In a specific embodiment, the nanopores are about 5.4 nm in diameter.

In one embodiment, the catalyst comprises SBA16, cobalt and molybdenum.

In another embodiment, the catalyst comprises SBA15, cobalt and molybdenum.

In still another embodiment, the catalyst comprises SBA11, cobalt and molybdenum.

In yet another embodiment, the catalyst comprises MCM41, cobalt and molybdenum.

In a further embodiment, the catalyst comprises MCM48, cobalt and molybdenum.

Without being bound by theory, it is believed that mesoporous silica may play numerous roles in the present methods, including (1) control of the size of the catalyst nanoparticles, and thus influencing the diameter of the Single-Walled Carbon Nanotubes; (2) acting as a high-surface-area barrier to prevent the catalyst nanoparticles from merging together at high CVD temperatures; (3) control of the tube orientation due to the ordered nature ordered nature of the nanoporous substrate, and (4) having a catalytic effect upon the decomposition of the carbon feedstock.

The levels of cobalt and molybdenum present in the catalyst can be controlled so that the mesoporous silica has a high thermal stability, thus allowing for the catalyst to retain its intrinsic mesostructure under thermal CVD conditions. In addition, due to the surface effect of the mesoporous silica, the active cobalt/molybdenum oxides can be well dispersed in the mesostructure with the particle size confined by the channel dimension. Small catalyst particle sizes are believed to provide smaller diameter Single-Walled Carbon Nanotubes.

Substrate

The substrate provides a support surface for the catalyst, and the catalyst can be affixed to the surface of the substrate as a thin film or in various patterns. Suitable materials for the substrate include but are not limited to, alumina, silicates, aluminum silicates, quartz, carbon, and metals, including but not limited to, gold, platinum, palladium and molybdenum.

In one embodiment, the substrate has a substantially planar surface.

In one embodiment, the substrate is a silicate.

In one embodiment, the substrate is a flake.

In another embodiment, the substrate is a wafer.

In still another embodiment, the substrate is a Si wafer.

In another embodiment, the substrate is a p-Type Si wafer.

In a specific embodiment, the substrate is a p-Type Si wafer having an oxide layer, wherein the oxide layer has a thickness of about 400 nm.

A catalyst precursor solution can be affixed to a substrate in the form of: (a) a thin film, using spin-coating or dip-coating; or (b) various micro-patterns using photolithography or soft lithography, wherein the catalyst may be placed in any desired location on the printed substrate. The catalyst/substrate samples are then calcined for an appropriate time and at an appropriate temperature in order to provide the 3D mesoporous structure as well as CoMo complex oxide nanoparticles.

In one embodiment, the catalyst is affixed to the substrate using dip-coating, drop-coating, or spin-coating.

In another embodiment, the catalyst is affixed to the substrate using photolithography or soft lithography.

Figure 1:
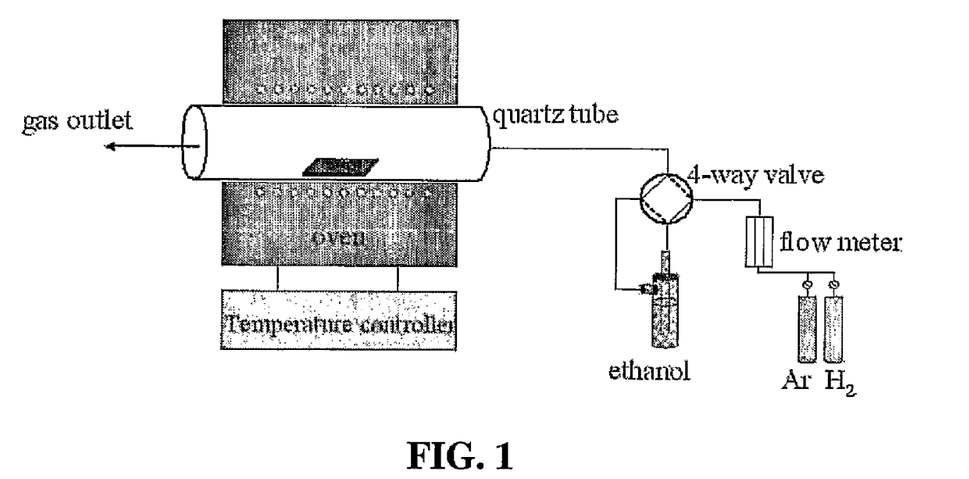
FIG. 1 shows a schematic diagram of the carbon vapor deposition apparatus used in the present methods.
Figure 2:
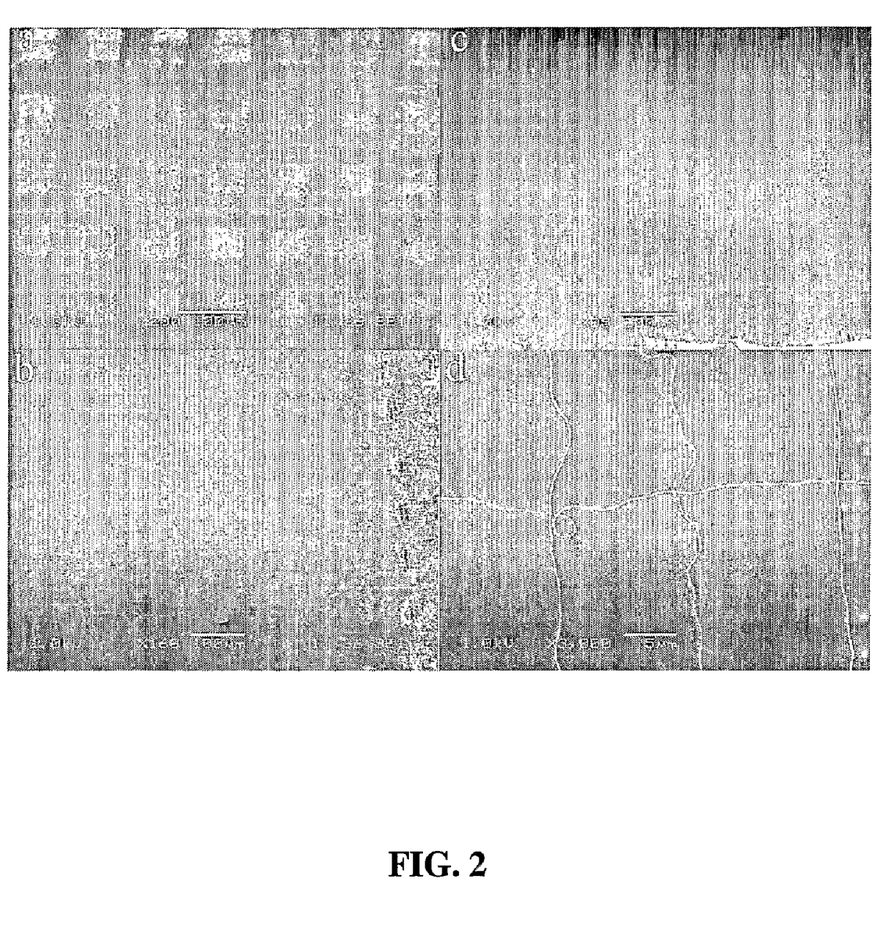
FIG. 2 shows SEM images of Single-Walled Carbon Nanotubes that were made using the present methods. The nanotubes appear as bright lines over a darker background. (a) shows SEM images of well-aligned arrays of Single-Walled Carbon Nanotubes growing from micro-patterned catalyst islands; (b) and (c) show isolated, ultralong and parallel nanotube arrays extending from the edge of the catalyst patterns with different orientations; and (d) shows a cross-junction of nanotube arrays made using a two-step CVD process comprising the methods of the present invention.

In another embodiment, the catalyst is printed on the substrate as a pattern of separate squares as illustrated, for example, in FIG. 2(a).

In one embodiment, the catalyst is affixed to the substrate and the catalyst-containing substrate is heated for about 2 hours at a temperature of about 550° C. in order to calcine the catalyst. In a specific embodiment, the catalyst-containing substrate is heated in air.

The substrate may be fabricated to have one or more slits or trenches on its surface.

In one embodiment, substrates having slits or trenches can be made using photolithography, then dip-coated with a catalyst solution. The slits have a length of about 1 mm to about 5 mm. In certain embodiments the slits have a length of about 1 mm, about 2 mm, about 3 mm, about 4 mm and about 5 mm.

The slits have a width of about 10 μM to about 200 μM. In one embodiment, the slits have a width of about 20 μM to about 100 μM. In certain embodiments the slits have a width of about 20 μM, about 30 μM, about 40 μM, about 50 μM, about 60 μM, about 70 μM, about 80 μM, about 90 μM and about 100 μM.

In one embodiment, one or more slits or trenches are made on a substrate using photolithography.

In one embodiment, one or more slits or trenches are made on a substrate prior to affixing a catalyst to the substrate.

In another embodiment, one or more slits or trenches are made on a substrate after catalyst is affixed to the substrate.

When used in the present methods, the substrates having slits or trenches can provide parallel and straight arrays of Single-Walled Carbon Nanotubes.

In one embodiment, a substrate having one or more slits is positioned so the slit axis is perpendicular to the direction of carbon feedstock gas flow during the CVD procedure.

Carbon Feedstock

The carbon feedstock consists of carbon containing organic compounds or mixtures thereof. Suitable carbon feedstocks include, but are not limited to organic alcohols, such as methanol, ethanol, n-propanol, isopropanol, n-butanol, isobutanol, sec-butanol and tert-butanol; aromatic hydrocarbons such as benzene, toluene, and xylene; aliphatic hydrocarbons, such as methane, ethane, propane, ethylene, propylene and acetylene; or mixtures thereof.

In one embodiment, the carbon feedstock is an organic alcohol.

In another embodiment, the carbon feedstock is methanol or ethanol.

In a specific embodiment, the carbon feedstock is ethanol.

Methods for Making the Single-Walled Carbon Nanotubes

As stated above, the present invention provides a method for making Single-Walled Carbon Nanotubes, the method comprising contacting a calcined catalyst with a flow of carbon feedstock gas for a time and at a temperature sufficient to make a single-walled carbon nanotube.

General Procedure for Making a Single-Walled Carbon Nanotube Using Carbon Vapor Deposition (CVD)

A substrate to which a catalyst has been affixed is placed in the middle of a one-inch diameter quartz tube furnace that is at room temperature. A flow of an inert gas/$H_2$ gas mixture (350 sccm/50 sccm) is then introduced into the furnace and the furnace is gradually heated from room temperature to the desired reaction temperature.

Carbon feedstock vapor is then delivered to the furnace by bubbling an inert gas into a pool of the carbon feedstock. The resulting mixture gas (inert gas/carbon feedstock) is then delivered to the furnace and the CVD process is carried out for a time and at a temperature sufficient to make a Single-Walled Carbon Nanotube.

In one embodiment, the carbon feedstock is ethanol and the inert gas is argon.

In one embodiment, the flow rate of the inert gas into the carbon feedstock pool is from about 20 sccm to about 1000 sccm. In another embodiment the flow rate of the inert gas into the carbon feedstock pool is from about 20 sccm to about 100 sccm. In yet another embodiment, the flow rate of the inert gas into the carbon feedstock pool is from about 500 sccm to about 800 sccm.

In one embodiment, the CVD process is carried out at a furnace temperature of from about 350° C. to about 1000° C.

In another embodiment, the CVD process is carried out at a furnace temperature of from about 700° C. to about 850° C.

In another embodiment, the CVD process is carried out at a furnace temperature of from about 850° C.

In one embodiment, the CVD process is carried out for a time of about 1 minute to from about 2 hours.

In another embodiment, the CVD process is carried out for a time of from about 10 minutes to about 1 hour.

In another embodiment, the CVD process is carried out for a time of from about 20 minutes to about 30 minutes.

In a specific embodiment, the CVD process is carried out at a furnace temperature of about 850° C. for a time of about 20 minutes.

In one embodiment, horizontally aligned Single-Walled Carbon Nanotubes can be grown directly on a substrate surface or, in another embodiment, across trenches/slits that are present on the surface of the substrate. The present methods can afford parallel and straight nanotube arrays grown across slits or trenches without the need for guidance from strong electric fields.

In one embodiment, the substrate surface is parallel to the flow of the carbon feedstock gas.

In another embodiment, the substrate surface is positioned at an angle to the flow of the carbon feedstock gas. In one embodiment, the angle is from about 5 degrees to about 50 degrees. In another embodiment, the angle is from about 10 degrees to about 40 degrees. In still another embodiment, the angle is from about 20 degrees to about 30 degrees. In a specific embodiment, the angle is about 30 degrees.

In another embodiment, the orientation of the Single-Walled Carbon Nanotubes produced by the present methods is parallel to the direction of the carbon feedstock gas flow.

In still another embodiment, the present methods can be used to fabricate parallel arrays of Single-Walled Carbon Nanotubes.

In one embodiment, the Single-Walled Carbon Nanotubes made using the present methods are individual Single-Walled Carbon Nanotubes.

In another embodiment, the present methods can be used to fabricate two-dimensional networks of Single-Walled Carbon Nanotubes.

In one embodiment, the present methods can be used to make SWNTs having a diameter of from about 0.3 nm to about 4 nm.

In another embodiment, the present methods can be used to make SWNTs having a diameter of from about 0.5 nm to about 3 nm.

In another embodiment, the present methods can be used to make SWNTs having a diameter of from about 0.8 nm to about 1.8 nm.

In one embodiment, the present methods can be used to make SWNTs having a length of from about 1 nm to about 100 cm.

In another embodiment, the present methods can be used to make SWNTs having a length of from about 1 mm to about 10 cm.

In still another embodiment, the present methods can be used to make SWNTs having a length of from about 100 mm to about 1 cm.

Measurement of Nanotube Dimensions

Figure 5:
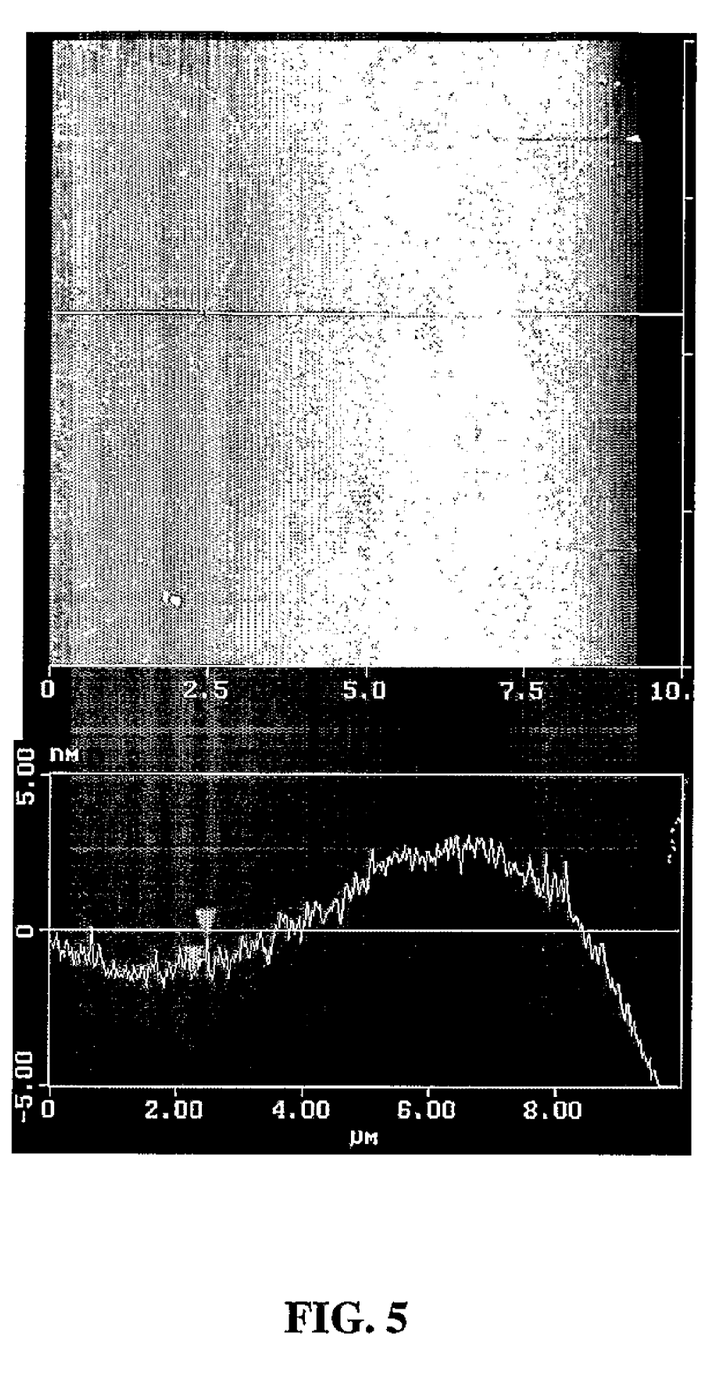
FIG. 5 shows a tapping-mode AFM image of individual Single-Walled Carbon Nanotubes made using the methods of the present invention (top diagram) and the corresponding height measurement of individual Single-Walled Carbon Nanotubes (bottom diagram).

The dimensions of Single-Walled Carbon Nanotubes made using the present methods can be measured using Atomic Force Microscopy (AFM) and Raman Scattering Spectroscopy. For example, FIG. 5 shows the tapping mode AFM image of representative Single-Walled Carbon Nanotubes that were made using the present methods. These nanotubes, which are extending from catalyst patterns have diameters of 1.0, 1.1, and 1.2 nm, respectively, based on their height measurements. These nanotubes can exist as individual nanotubes as opposed to small bundles of nanotubes.

Figure 6:
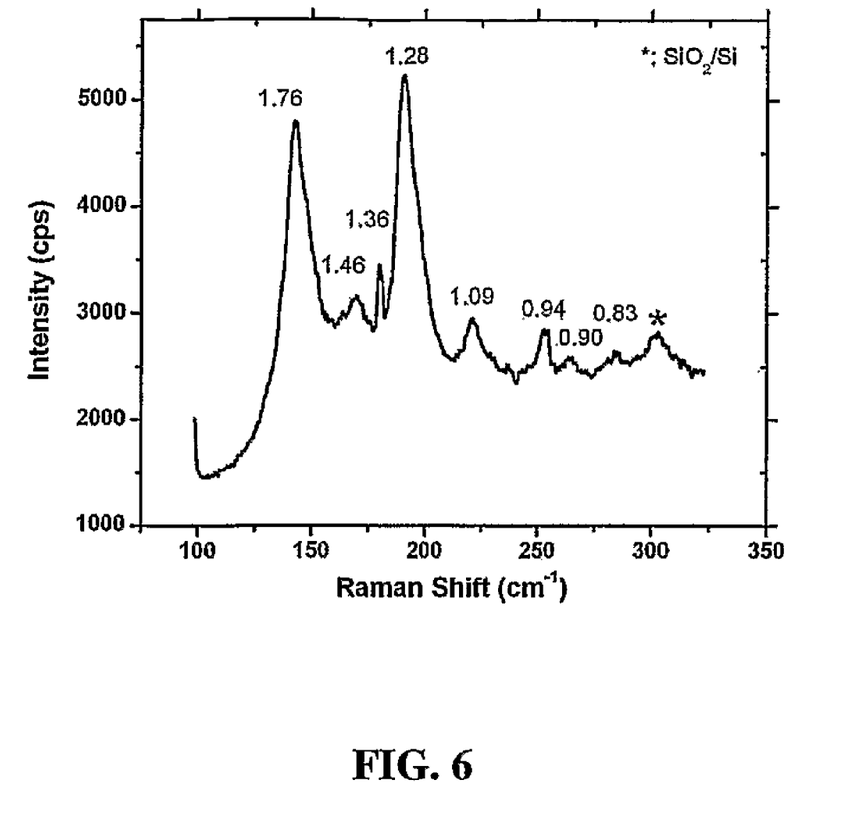
FIG. 6 shows a Raman scattering pattern of a Single-Walled Carbon Nanotube.

The diameters of the Single-Walled Carbon Nanotubes that are made using the present methods can also be measured using a resonant Raman spectra in which every radial breathing mode (RBM) peak corresponds to a specific tube diameter. The Raman spectrum shown in FIG. 6 corresponds to representative Single-Walled Carbon Nanotubes that were made using the present methods and indicate that nanotubes grown in accordance with the present methods can have a relatively narrow size distribution, for example, from 0.8 nm to 1.8 nm in diameter.

Uses of the Single-Walled Carbon Nanotubes

The Single-Walled Carbon Nanotubes of the invention may be useful for numerous applications, including, but not limited to making electrical connections in integrated circuits or semiconductor chips, as probes in scanning tunneling microscopes, scanning probe microscopes and atomic force microscopes, as field emitters of electrons for electronic applications, as antennas, and as supports for catalysts used in chemical processes. In addition, the Single-Walled Carbon Nanotubes of the invention, either alone or in groups of two or more, may be used in power transmission cables, solar cells, batteries, antennas, and as molecular electronics.

In addition, the present methods, which allow for the controlled growth of individual, ultralong carbon nanotubes, may be useful for large-scale fabrication of nanotube-based devices.

The following examples are set forth to assist in understanding the invention and should not, of course, be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the invention incorporated herein.

EXAMPLES

General Methods

Scanning electron microscopy (SEM) images were obtained using a JEOL JSM-5600LV operated at 1 kV, or a Hitachi 4700 Field Emission SEM operated at 0.8 kV. Tapping-mold atomic force microscopy (AFM) images were obtained using a Nanoscope IIIa (Digital Instruments), and the tube diameters were derived from the corresponding height measurement. Raman scattering was performed using a confocal microscope equipped with a Trix spectrometer. The incident light from a HeNe laser (632.8 nm, 1 mW) was focused onto a 0.5 µm spot in diameter on samples. Radial breath mode (RBM) spectra were collected using a liquid-nitrogen cooled CCD camera. Each RBM peak ($v_{RBM}$, cm$^{-1}$) corresponds to a specific tube diameter (in nm), which can be calculated using the following equation: diameter(nm)= $223.75/(v_{RBM}-16)$.

Example 1

Preparation of a CoMo/SBA16 Catalyst Precursor Solution

A precursor solution of mesoporous SBA16 can be prepared by mixing tetraethoxysilane (TEOS), surfactant (Pluronic F127, $EO_{106}PO_{70}EO_{106}$), 0.1 M HCl, water, ethanol with molar ratio of 1:0.003-0.008:0.004-0.02:5-10: 20-50 according to the procedure set forth in Huang, et al., *Nano. Letters*, 3:299 (2003). A cobalt/molybdenum ("CoMo") species can then be incorporated into the mesostructure using a sol-gel process by mixing an ethanolic solution of $Co(OAc)_2$ and either $MoO_2Cl_2$ or $Mo(OAc)_2$ (wherein the molar ratio of Co:Mo ranges from 1:0.3 to 1:1) with the SBA16 precursor solution (molar ratio of CoMo/Si=0.4-1.5%).

Example 2

Preparation of Single-Walled Carbon Nanotubes from Micro-Patterned Catalyst Islands Step A—Catalyst Positioning on a Substrate Using Contact Microprinting A poly(dimethylsiloxame) (PDMS) stamp with a micro-pattern on surface was inked with a CoMo/SBA16 precursor solution (prepared according to Example 1). The inked stamp was then placed in close contact with a p-Type Si wafer having a 400 nm oxide layer in order to transfer the catalyst solution onto the substrate as a pattern of square catalyst islands, as depicted in FIG. 2(*a*). The catalyst solution that was printed on the silica wafer was allowed to dry at room temperature and the resulting catalyst-imprinted wafer was air-calcined at 550° C. for 2 h and used in Step B.

Step B—Growth of Nanotubes Using Carbon Vapor Deposition (CVD)

The calcined, catalyst-imprinted wafer prepared in Step A was placed in the middle of a one-inch diameter quartz tube furnace which was at room temperature, and a flow of a mixture of $Ar/H_2$ gas (350 sccm/50 sccm) was introduced to the furnace. The furnace was then heated from room temperature to a temperature of about 850° C. and ethanol vapor was delivered to the furnace by bubbling argon (500 sccm) through a cooled ethanol pool (at 0° C.) and transferring the resulting gas mixture (Ar/EtOH) to the furnace through a 4-way valve. The resulting reaction was allowed to take place at about 850° C. for about 20 minutes.

FIG. 2 shows SEM images of Single-Walled Carbon Nanotubes grown according to the method of Example 2. Dense and randomly oriented nanotubes are found on each catalyst island, and between the adjacent islands there are almost parallel bridging nanotube arrays growing (see FIG. 2(*a*)). At the edge of the patterns, well-oriented and isolated nanotubes grow in the direction of the gas flow and can reach lengths of up to about 4 mm after about 20 minutes of growth (see FIG. 2(*b*)). FIGS. 2(*b*) and 2(*c*) demonstrate that the present methods allow for directional control of parallel nanotube arrays by orienting the substrate with respect to the direction of gas flow. Additionally, a cross-connection of carbon nanotubes arrays can be easily fabricated using the present methods by repeating the CVD process in different directions (see FIG. 2(*d*)). These results further indicate that the growth direction of the Single-Walled Carbon Nanotubes produced using the present methods can be controlled via orientation of the gas flow.

Example 3

Growth of Carbon Nanotubes Across Slits Using Dip-Coated Substrates

Figure 3:
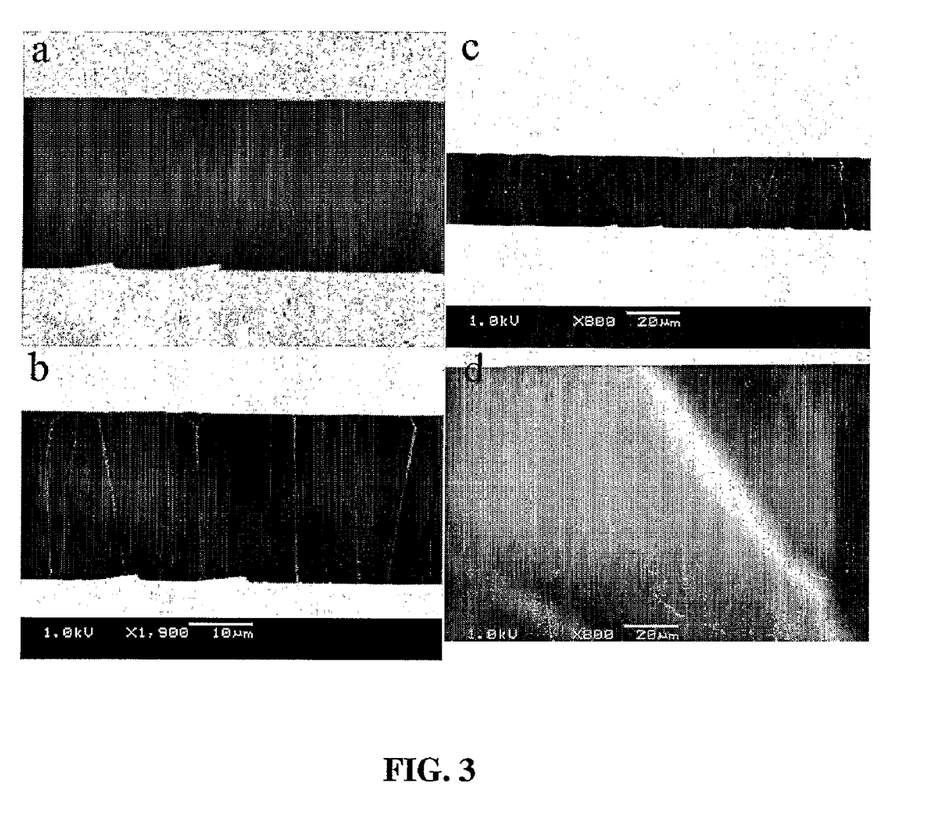
FIG. 3 shows SEM images of suspended Single-Walled Carbon Nanotubes growing across slits. The nanotubes appear as bright lines over a darker background.

The present methods can also provide parallel and straight nanotube arrays without the guide of strong electric fields when they grow across slits, as shown in FIG. 3. A p-type silica wafer having a slit on its surface was fabricated using photolithography. The slit had a length of about 2 mm and a width from about 20 µm to about 120 µm. The slit-containing wafer was dip-coated with a CoMo/SBA16 catalyst precursor solution (prepared as set forth in Example 1) and calcined at 550° C. for 2 hours. After calcination, it was placed in the center of a quartz furnace with the slits aligned perpendicular to the direction of gas flow direction and subjected to a CVD process as described in Example 2, step B, to produce representative Single-Walled Carbon Nanotubes which grow across the slits in a direction perpendicular to the slit axis. While only short and randomly oriented nanotubes are found on the sample surface (see FIG. 3(a)), straight, well-oriented and suspended nanotubes can be observed to grow across the slit (see FIGS. 3(b), 3(c) and 3(d)). These figures indicate that most of the nanotubes grow from the edge of a slit and can freely grow suspended over the slit in a direction parallel to the gas flow direction. The suspended nanotubes are very straight as compared to nanotubes which are grown on the surface of a substrate.

These results indicate that well oriented nanotube arrays can be grown across slits using the present methods.

Example 4

Growth of Carbon Nanotubes Across Trenches and Slits Using Micro-Patterned Substrates A p-Type Si wafer having a slit or trench on its surface was contact-printed with a CoMo/SBA16 precursor solution and calcined as described in Example 2, step A. The catalyst solution was printed so as to locate the edge of the catalyst pattern about 1 mm away from the edge of the slit or trench. The printed wafer was then air-calcined at 550° C. for 2 h and subjected to a CVD process according to the method described in Example 2, step B to produce Single-Walled Carbon Nanotubes which were grown suspended over the slit or trench.

Figure 4:
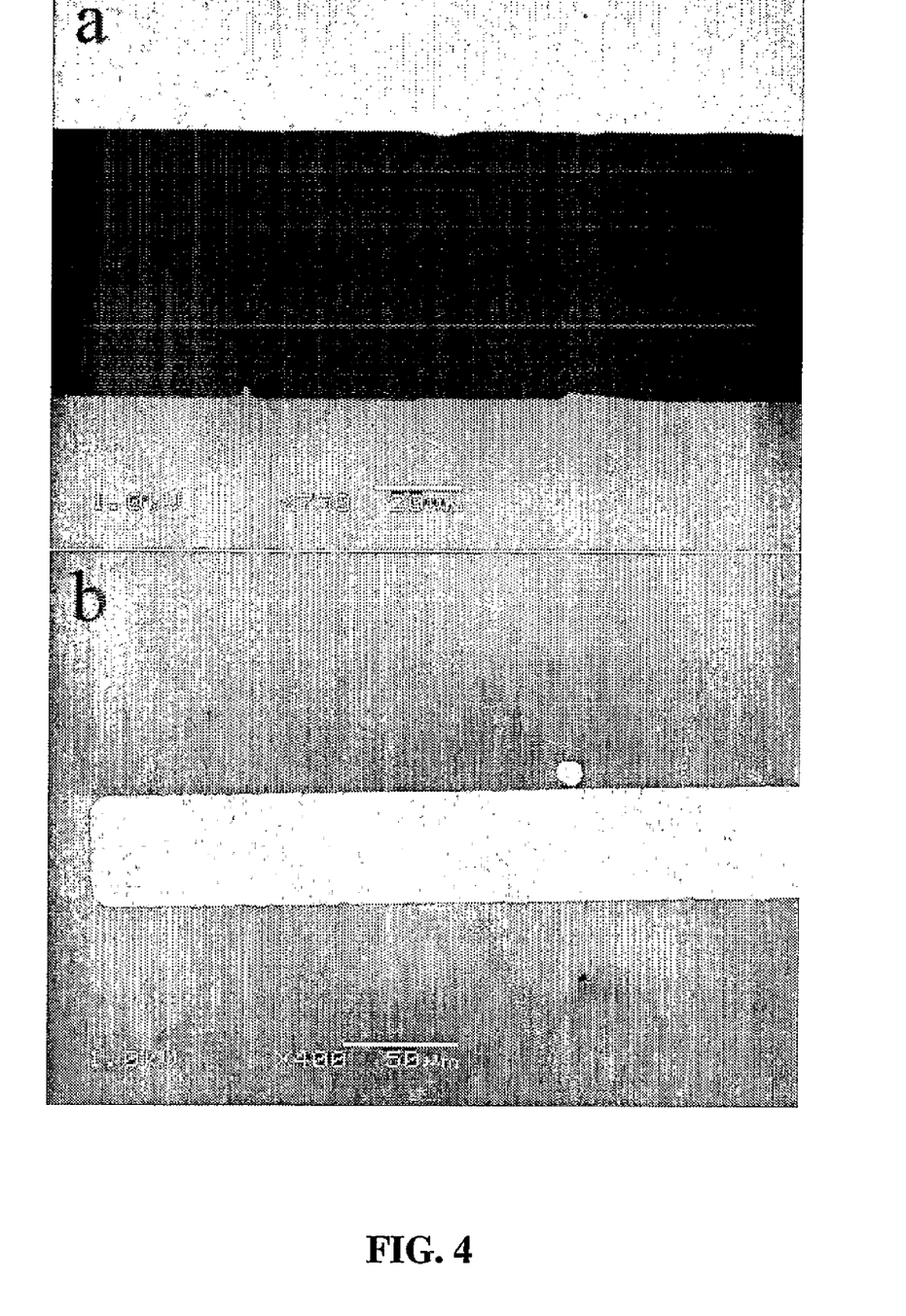
FIG. 4(a) shows SEM images of individual carbon nanotubes growing across a slit. The nanotubes appear as bright lines over a darker background.
FIG. 4(b) shows SEM images of individual carbon nanotubes growing across a trench. The nanotubes appear as bright lines over a darker background.

FIG. 4 shows SEM images of representative Single-Walled Carbon Nanotubes produced using this method and illustrates that that nanotubes can grow from the catalyst patterns in the direction of gas flow and further extend outward on the substrate surface for up to lengths of from about 4 to about 5 millimeters. These results indicate that the present methods can be used to grow long Single-Walled Carbon Nanotubes having lengths of about 4 mm to about 5 mm.

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

All references cited herein are incorporated by reference in their entirety.

What is claimed is:

1. A method for making a single-walled carbon nanotube, the method comprising:
    affixing a catalyst precursor solution to a surface of a substrate, wherein the catalyst precursor solution comprises mesoporous silica, cobalt, and molybdenum, wherein the affixing the catalyst precursor solution comprises at least one of spin-coating, dip-coating, drop-coating, contact printing, or micro-patterning the catalyst precursor solution onto the surface of the substrate;
    heating the substrate, for a time and temperature sufficient to calcine the catalyst precursor solution to form a calcined catalyst; and
    contacting the calcined catalyst with a flow of carbon feedstock gas for a time and at a temperature sufficient to make a single-walled carbon nanotube.

2. The method of claim 1, wherein the substrate comprises one of a silica wafer, a silicate, a flake, a silicon wafer, or a silicon wafer having an oxide layer.

3. The method of claim 1, wherein the mesoporous silica comprises at least one of SBA16, SBA15, SBA11, MCM41, or MCM48.

4. The method of claim 1, wherein the catalyst precursor solution is affixed to the substrate surface using at least one of spin-coating, dip-coating, or drop-coating.

5. The method of claim 1, wherein the catalyst precursor solution is affixed to the substrate surface using contact printing.

6. The method of claim 5, wherein the catalyst precursor solution is affixed to the substrate surface as a micro-pattern.

7. The method of claim 1, comprising growing the nanotube in a direction parallel to the flow of carbon feedstock gas.

8. The method of claim 1, wherein the nanotube has a diameter of from about 0.3 nm to about 4 nm.

9. The method of claim 8, wherein the nanotube has a diameter of from about 0.5 nm to about 3 nm.

10. The method of claim 9, wherein the nanotube has a diameter of from about 0.8 nm to about 1.8 nm.

11. The method of claim 1, wherein the nanotube has a length of from about 1 nm to about 100 cm.

12. The method of claim 11, wherein the nanotube has a length of from about 1 mm to about 10 cm.

13. The method of claim 11, wherein the nanotube has a length of from about 100 mm to about 1 cm.

14. The method of claim 1, wherein the nanotube is an individual nanotube.

15. The method of claim 1, wherein the substrate is heated for about 2 hours at a temperature of about 550° C.

16. The method of claim 1, wherein heating the substrate is carried out at a temperature of from about 350° C. to about 1000° C.

17. The method of claim 16, wherein the temperature is from about 700° C. to about 850° C.

18. The method of claim 17, wherein the temperature is about 850° C.

19. The method of claim 1, wherein the carbon feedstock comprises ethanol.

20. The method of claim 1, wherein the carbon feedstock is mixed with argon gas.

21. The method of claim 1, wherein the flow rate of the carbon feedstock gas is between about 20 sccm to about 1000 sccm.

22. The method of claim 21, wherein the flow rate of the carbon feedstock gas is between about 20 sccm to about 100 sccm.

23. The method of claim 21, wherein the flow rate of the carbon feedstock gas is between about 500 sccm to about 800 sccm.

24. The method of claim 1, wherein the surface of the substrate has one or more slits.

25. The method of claim 1, wherein the surface of the substrate has one or more trenches.

26. The method of claim 15, wherein the heating is performed in air.

27. The method of claim 1, comprising preparing the catalyst precursor solution by preparing a mesoporous silica solution and incorporating cobalt and molybdenum into the mesoporous silica solution.

* * * * *

UNITED STATES PATENT AND TRADEMARK OFFICE
CERTIFICATE OF CORRECTION

PATENT NO.        : 8,367,034 B2
APPLICATION NO.   : 11/628256
DATED             : February 5, 2013
INVENTOR(S)       : O'Brien et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1673 days.

Signed and Sealed this
First Day of September, 2015

Michelle K. Lee
*Director of the United States Patent and Trademark Office*